US006229478B1

(12) United States Patent
Biacs et al.

(10) Patent No.: US 6,229,478 B1
(45) Date of Patent: May 8, 2001

(54) NEAR-REAL TIME DGPS NETWORK AND SERVER SYSTEM

(75) Inventors: Zoltan Biacs, San Francisco; John Rogers; Jinye Li, both of Sunnyvale, all of CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/187,690

(22) Filed: Nov. 5, 1998

(51) Int. Cl.[7] ............................... H04B 7/185; G01S 5/02

(52) U.S. Cl. ................................. 342/357.03; 342/357.1; 342/357.09; 701/215

(58) Field of Search ......................... 342/357.03, 357.09, 342/357.1; 701/215

(56) References Cited

U.S. PATENT DOCUMENTS 5,638,077 * 6/1997 Martin .
5,739,786 * 4/1998 Greenspan et al. .
5,878,369 * 3/1999 Rudow et al. ....................... 701/215
6,064,336 * 5/2000 Krasner ........................... 342/357.05

* cited by examiner

*Primary Examiner*—Theodore M. Blum
(74) *Attorney, Agent, or Firm*—Wagner, Murabito & Hao LLP

(57) ABSTRACT

A method and system for rapidly initializing a rover unit in a networked system. In one embodiment, the present invention acquires rover unit initialization data at a reference station. In one embodiment, the rover unit initialization data is selected from the group consisting of: ephemeris data, almanac data, satellite health data, ionospheric data, UTC and GPS time and approximate rover position information. In the present embodiment, the present invention then communicatively couples the reference station to a server station having memory for storing the rover unit initialization data. After communicatively coupling the reference station to the server station, the present embodiment transfers the rover unit initialization data from the reference station to the server station. The present embodiment then communicatively couples the rover unit to the server station. Next, the present embodiment supplies the rover unit initialization data from the server station to the rover unit. As a result, in the present embodiment, the rover unit is able to be initialized and obtain a first position fix without requiring the rover unit to acquire the initialization data directly from at least one satellite. In another embodiment, the present invention provides a method and system for providing differentially corrected position information to a rover unit in a networked system. In still another embodiment, the present invention provides a method and system for providing both initialization data and differentially corrected position information to a rover unit in a networked system.

30 Claims, 9 Drawing Sheets

Reference Station 102a
Reference Station 102b
Server Station 100
Rover Unit 104
Reference Station 102d
Reference Station 102c

NEAR-REAL TIME DGPS NETWORK AND SERVER SYSTEM

TECHNICAL FIELD

The present invention relates to position location systems. In particular, the present invention pertains to a networked position location system.

BACKGROUND ART

Position determination devices, such as hand-held GPS (global position system) receivers are widely used and well known in the art. Such devices typically receive signals from a plurality of GPS satellites, perform complex measurements on the received signals, and analyze various other information received from the satellites (e.g. ephemeris data). These steps are performed by conventional position determination devices in order to compute the location of the position determination device. It will be understood that in order to perform the aforementioned complex measurements and signal analyses, a conventional position determination device must have sophisticated hardware and system components. The sophisticated hardware and system components are a source of significant cost in such position determination devices.

In addition to having each position determination device operate independently, some prior art approaches employ a networked system. In a conventional networked system, typically each position determination device (sometimes referred to as a rover unit) is coupled to a central base. In many instances, the user of the rover units may subscribe to or pay a fee to access the networked system. Upon computing their respective positions, the numerous position determination devices or rover units report their position to the central base. As a result, the central base (e.g. a dispatch station) is aware of the respective locations of the various rover units. The position information of the rover units is often made available to the other rover units via the central base. In such a networked system, the number of rover units can vary widely. For example, a large percentage or a small percentage of the eligible or subscribing rover units may be accessing the system at a given time. Additionally, the networked system may periodically be receiving new subscribers. That is, a new user may purchase a new rover unit and then attempt to utilize the networked system.

One prior art example of networked system is described in U.S. Pat. No. 5,663,734 to Krasner, entitled "GPS Receiver and Method for Processing GPS Signals." The Krasner reference illustrates several of the disadvantages associated with prior art networked systems. For example, the base station commands or directs the remote unit to perform various functions, such as reporting the remote unit's location to the base station. As a result, a considerable processing and control burden is placed on the base station. Additionally, in the Krasner system, the maximal range that the remote unit can extend from the base station is limited to approximately ½ the speed of light times the PRN (pseudo-random noise) repetition period (1 millisecond). This distance is calculated to be approximately 150 kilometers. The relatively short maximal range limits the usefulness of conventional networked systems such as the system of the Krasner reference. That is, operation of the rover units is restricted to only a limited distance from the base station.

Another drawback, during normal use (e.g. when first turned-on) a conventional position determination device/rover unit undergoes a time-consuming initialization process. During this process, the rover unit gathers substantial initialization data from the GPS satellites. The initialization data is required for the position determination device to be operable and in condition to determine position information. Additionally, the initialization process is often confusing to the average consumer. The drawbacks associated with a conventional time-consuming initialization process are further compounded in a networked system due to the constant addition of new subscribing rover units to the network. That is, each of multiple new subscribing rover units has to be completely initialized before use, and multiple new users are often confused by the initialization process.

In addition to the aforementioned drawbacks, a rover unit must be very inexpensive in order for the rover unit to be attractive to and affordable for the average consumer. Therefore, it is not commercially feasible to attempt to resolve any of the aforementioned drawbacks by significantly increasing the complexity, and, correspondingly, the cost of the system and hardware components of the rover unit. Previous self-contained GPS receivers could do everything necessary to obtain a position fix, but at significant expense. It would be desirable to reduce the costs of obtaining position in a device that already includes a communications system.

Thus, a need has arisen for a method and system for improving the operation of a rover unit in a networked system. Moreover, a need exists for a method and system for improving the operation of a rover unit in a networked system without significantly increasing the system and hardware requirements of the rover unit.

DISCLOSURE OF THE INVENTION

The present invention provides a method and system for improving the operation of a rover unit in a networked system. Moreover, the present invention provides a method and system for improving the operation of a rover unit in a networked system without significantly increasing the system and hardware requirements of the rover unit. In one embodiment, the present invention provides a method and system for rapidly initializing a rover unit. In this embodiment, the present invention acquires rover unit initialization data at a reference station. In this embodiment, the rover unit initialization data is selected from the group consisting of: ephemeris data, almanac data, satellite health data, ionospheric model data, and GPS and UTC time information, and approximate position. In the present embodiment, the present invention then communicatively couples the reference station to a server station having memory for storing the rover unit initialization data. After communicatively coupling the reference station to the server station, the present embodiment transfers the rover unit initialization data from the reference station to the server station. The present embodiment then communicatively couples the rover unit to the server station. Next, the present embodiment supplies the rover unit initialization data from the server station to the rover unit. As a result, in the present embodiment, the rover unit is able to be initialized and obtain a first position fix without requiring the rover unit to acquire the initialization data directly from at least one satellite.

In another embodiment, the present invention provides a method and system for providing differentially corrected position information to a rover unit. In this embodiment the server station includes a differential correction engine for differentially correcting position information when requested. The reference station, which is communicatively coupleable to the server station, provides differential correction data to the server station such that the server station is able to utilize the differential correction data when differentially correcting position information. The rover unit, which is also communicatively coupleable to the server station, has a position generation engine for providing position information of the rover unit. When desired, the rover unit forwards its position information to the server station and requests the server station to differentially correct the position information of the rover unit and return differentially corrected position information of the rover unit to the rover unit. As a result, in the present embodiment, the rover unit is able to acquire differentially corrected position information upon demand without requiring the rover unit to have a differential correction engine integral therewith.

In still another embodiment, the present invention includes the features of both of the above-described embodiments. That is, in the present embodiment, the present invention provides a method and system for both rapid initializing and providing differential corrections to a rover unit in a networked system.

Other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
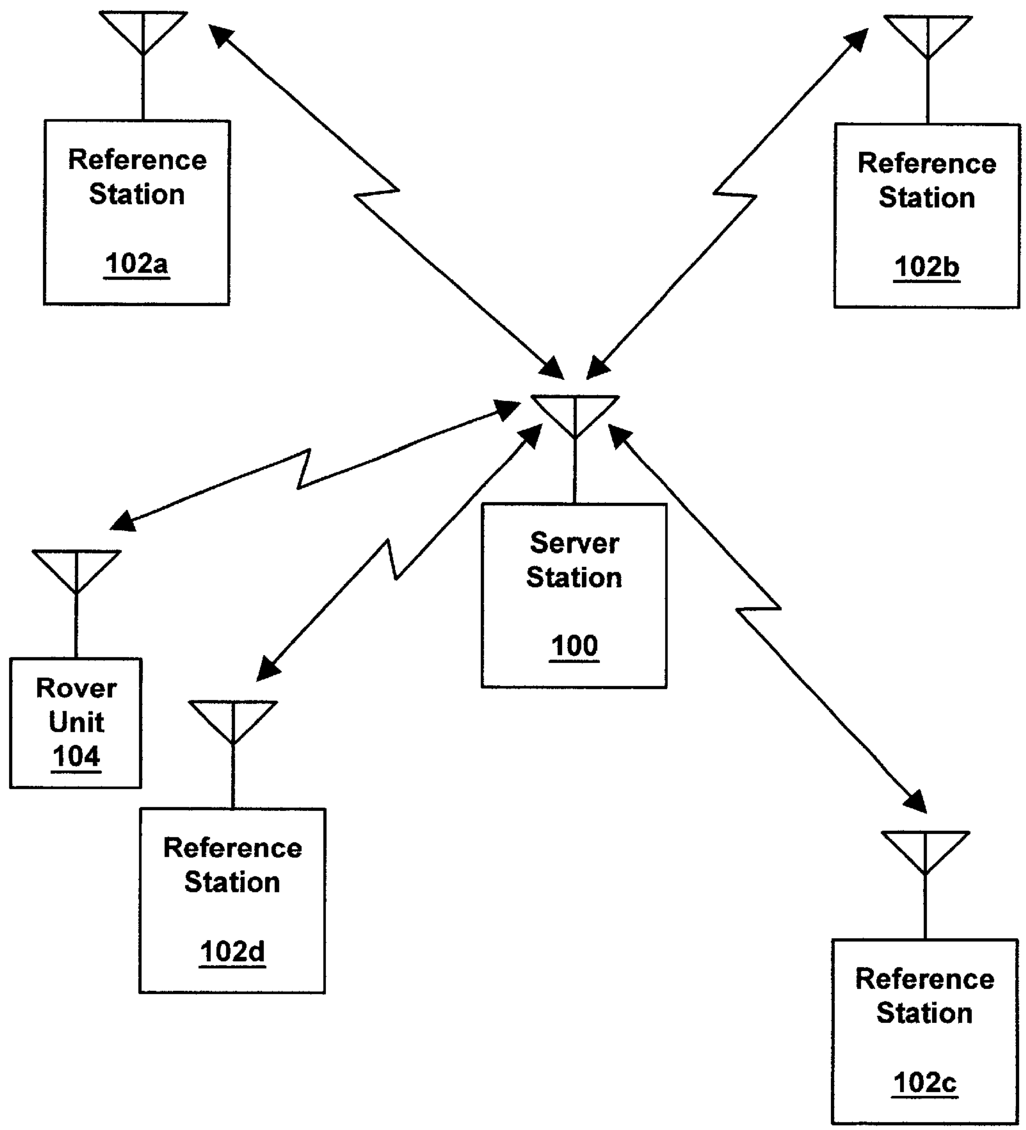
FIG. 1 is a schematic diagram of various components of a networked system in accordance with one embodiment of the present claimed invention.

With reference now to FIG. 1, a schematic diagram of a networked system in accordance with one embodiment of the present invention is shown. The following discussion will begin with a detailed description of the structure and features of the various components of the present invention. A detailed description of the operation of the present invention will then follow. Regarding the physical characteristics of the present embodiment, in FIG. 1, a server station 100 is shown. Server station 100 of the present embodiment is adapted to be communicatively coupled to a plurality of reference stations typically shown as 102*a*, 102*b*, 102*c*, and 102*d*. Additionally, in the embodiment of FIG. 1, a rover unit 104 is shown. Rover unit 104, like reference stations 102*a*–102*d*, is also adapted to be communicatively coupled to server station 100. In the embodiment of FIG. 1, only a single server station 100 is shown. The present invention is, however, well suited to an embodiment in which more than one server station is present. Likewise, although only a single rover unit 104 is shown for purposes of clarity in the embodiment of FIG. 1, the present invention is intended to accommodate multiple rover units. Furthermore, only four reference stations, 102*a*–102*d*, are shown in FIG. 1 for purposes of clarity. The present invention is, however, well suited to various embodiments having fewer or greater than four reference stations.

Figure 2:
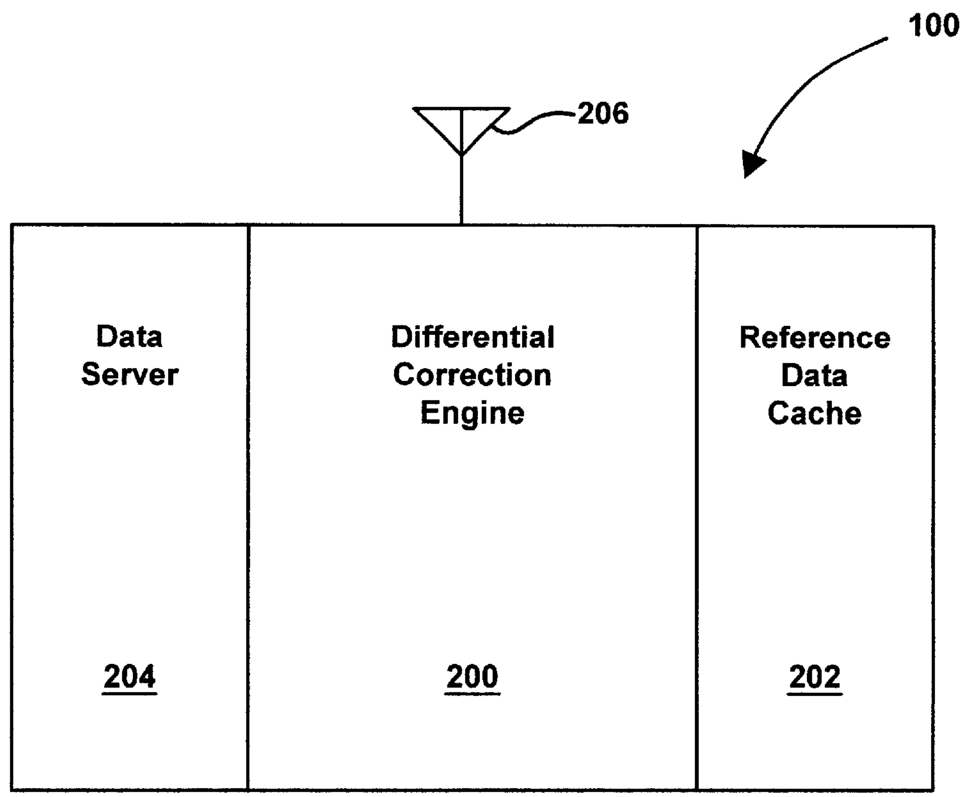
FIG. 2 is a schematic diagram of one embodiment of a server station including a differential correction engine in accordance with one embodiment of the present claimed invention.

Referring now to FIG. 2, a schematic diagram of one embodiment of server station 100 of the present invention is shown. In the present embodiment, server station 100 includes a differential correction engine 200 which is adapted to differentially correct position information when requested. Server station 100 of the present embodiment also includes a memory component, for example, reference data cache 202, for storing various data. Server station 100 also includes a data server component 204 for receiving from and forwarding data to other components of the present invention such as, for example, reference stations 102*a*–102*d*, and rover unit 104, both of FIG. 1. In the present embodiment, data server component 204 includes communication components such as a receiver, a transmitter, and the like, which allow server station 100 to communicate effectively with, for example, reference stations 102*a*–102*d* and rover unit 104. Also in the present embodiment, a transceiver antenna 206 is shown coupled to server station 100. It will be understood that transceiver antenna 206 is adapted to transmit and receive various signals.

Figure 3:
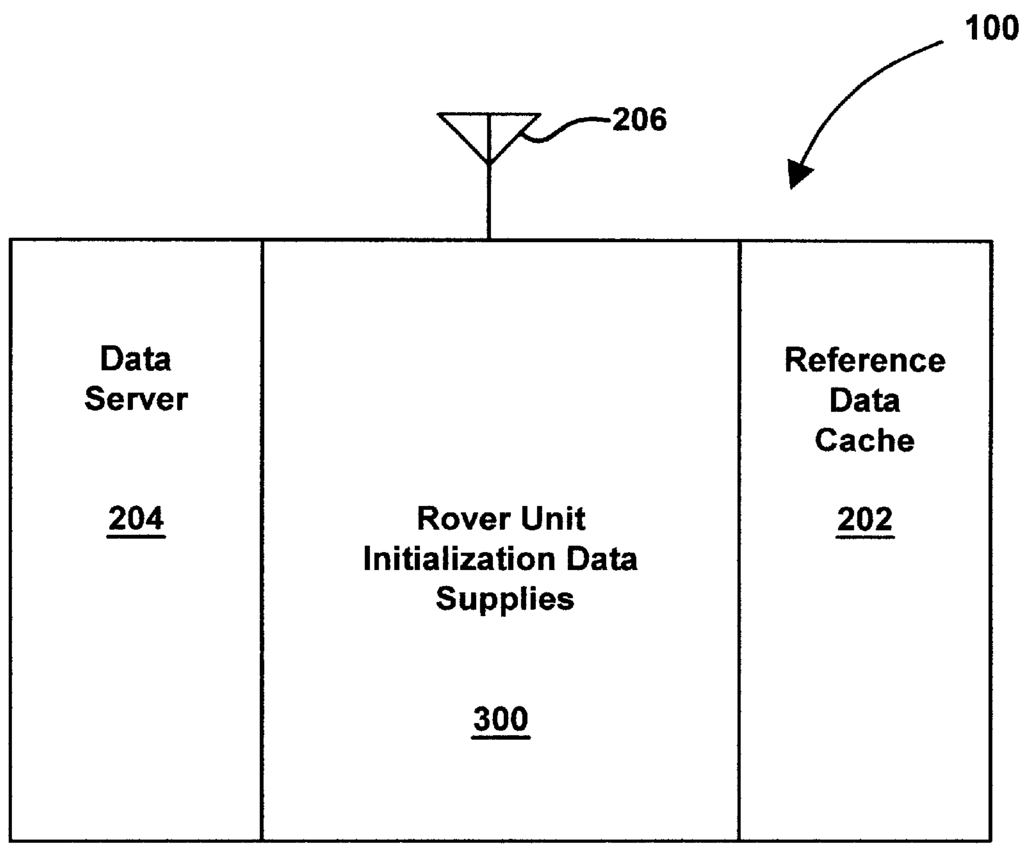
FIG. 3 is a schematic diagram of another embodiment of a server station including a rover unit initialization data supplier in accordance with one embodiment of the present claimed invention.

Referring now to FIG. 3, a schematic diagram of another embodiment of server station 100 of the present invention is shown. In the present embodiment, server station 100 includes a rover unit initialization data supplier 300 which is adapted to provide initialization information to rover unit 104 of FIG. 1 when requested. As in the embodiment of FIG. 2, server station 100 of the present embodiment also includes a memory component, for example, reference data cache 202, for storing various data. Server station 100 also includes a data server component 204 for receiving data from and forwarding data to other components of the present invention such as, for example, reference stations 102*a*–102*d,* and rover unit 104, both of FIG. 1. In the present embodiment, data server component 204 includes communication components such as, for example, a modem, a receiver, a transmitter, and the like. In one embodiment of the present invention, the communications components of the present invention are comprised of components which communicate over a communication network via, for example, a WAN (wide area network), a radio modem, and the like. These communication components allow server station 100 to communicate effectively with, for example, reference stations 102*a*–102*d,* and rover unit 104. Also in the present embodiment, a transceiver antenna 206 is shown coupled to server station 100. It will be understood that transceiver antenna 206 is adapted to transmit and receive various signals.

Figure 4:
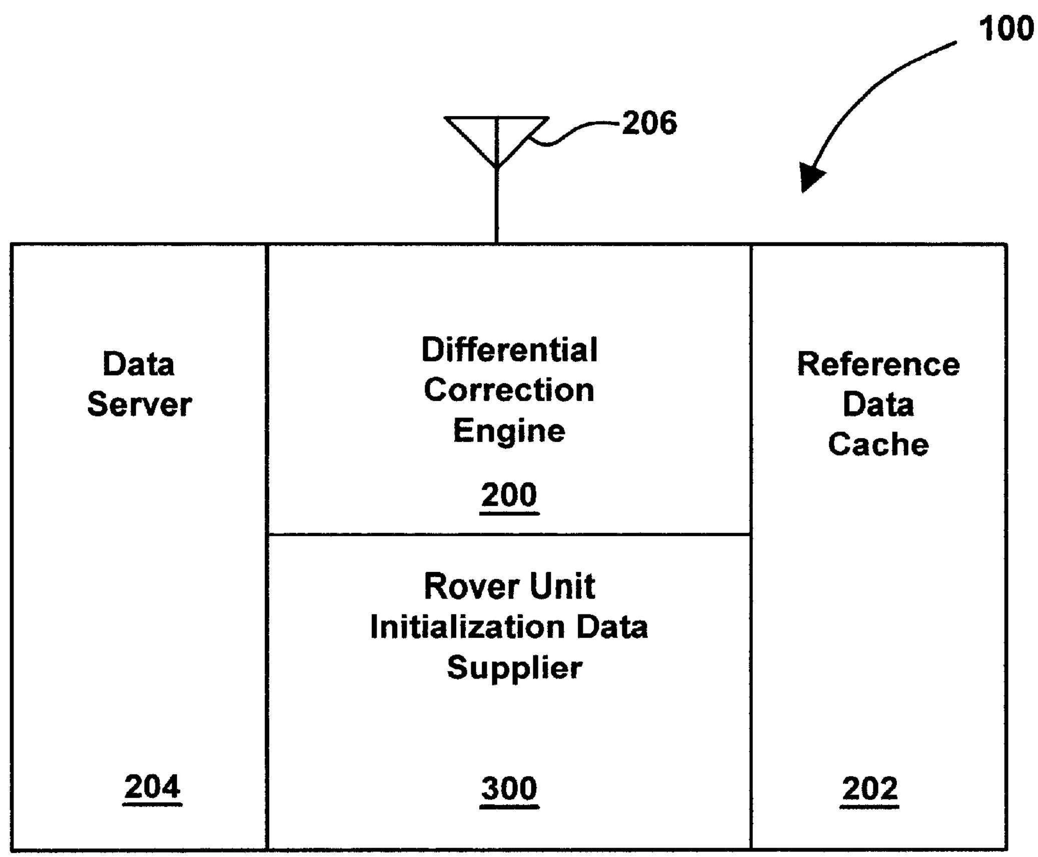
FIG. 4 is a schematic diagram of yet another embodiment of a server station including both a differential correction engine and a rover unit initialization data supplier in accordance with one embodiment of the present claimed invention.

With reference now to FIG. 4, a schematic diagram of yet another embodiment of server station 100 of the present invention is shown. In the present embodiment, server station 100 includes a differential correction engine 200 which is adapted to differentially correct position information when requested. In the embodiment of FIG. 4, server station 100 also includes a rover unit initialization data supplier 300, which is adapted to provide initialization information to rover unit 104 of FIG. 1 when requested. In the present embodiment, server station 100 also includes the various other features (e.g. reference data cache 202, data server component 204, and transceiver antenna 206) which are described in detail above in conjunction with the embodiments of FIGS. 2 and 3. In the present embodiment, differential correction engine 200 and rover unit initialization data supplier 300 will both utilize some of the same data collected by reference station 102*d.* For example, as will be described below, reference station 102*d* will gather data such as almanac information, ephemeris data, approximate GPS time, satellite health information, ionospheric model data, and the like.

Figure 5:
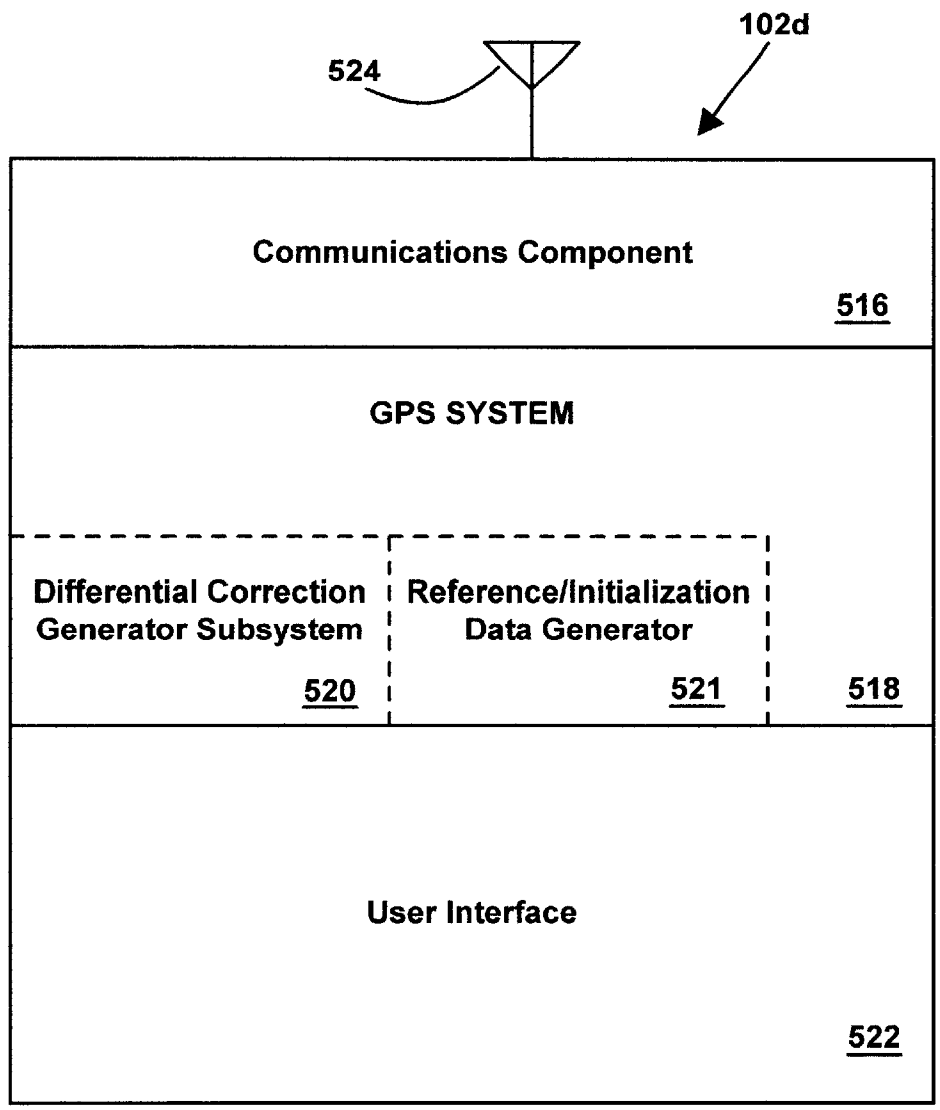
FIG. 5 is a schematic diagram of one embodiment of a reference station in accordance with one embodiment of the present claimed invention.

Referring now to FIG. 5, a schematic diagram of reference station 102*d* is shown. Although reference station 102*d* is shown in the embodiment of FIG. 5, it will be understood that the following description also pertains to reference stations 102*a,* 102*b,* and 102*c.* As shown in FIG. 5, reference station 102*d* includes a communications component 516. Communications component 516 is used for communication between, for example, server station 100 and other reference stations 102*a,* 102*b,* 102*c,* and 102*d* all of FIG. 1. Reference station 102*d* also includes a position determination system 518 for generating position information for reference station 102*d.* In the present embodiment, position determination system 518 is, for example, a satellite-based radio navigation system such as the Global Positioning System (GPS), or the Global Orbiting Navigational System (GLONASS). Although such systems are specifically mentioned in the present embodiment, the present invention is also well suited to land-based radio navigation systems such as, for example, LORAN, and the like. Additionally, reference station 102*d* includes a differential correction generator subsystem 520 for providing differential correction information. Such differential correction information includes, for example, pseudorange corrections (PRC) and range rate corrections (RRC).

Furthermore, reference station 102*d* includes a user interface 522. In the embodiment of FIG. 5, user interface 522 is comprised, for example, of: a keyboard; a graphic display; a mouse; and the like to enable a user to access and interact with reference station 102*d.* In the present embodiment, such interaction will include programming reference station 102*d,* selecting various operating parameters for reference station 102*d,* and the like. Also, in the present embodiment, a transceiver antenna 524 is shown coupled to reference station 102*d.* It will be understood that transceiver antenna 524 is adapted to transmit and receive various signals. In the present embodiment, reference station 102*d* also includes a reference/initialization data generator 521 for obtaining initialization data. Such initialization data includes, for example, ionospheric data, satellite health information, almanac information, ephemeris information, and UTC and GPS time information.

Figure 6:
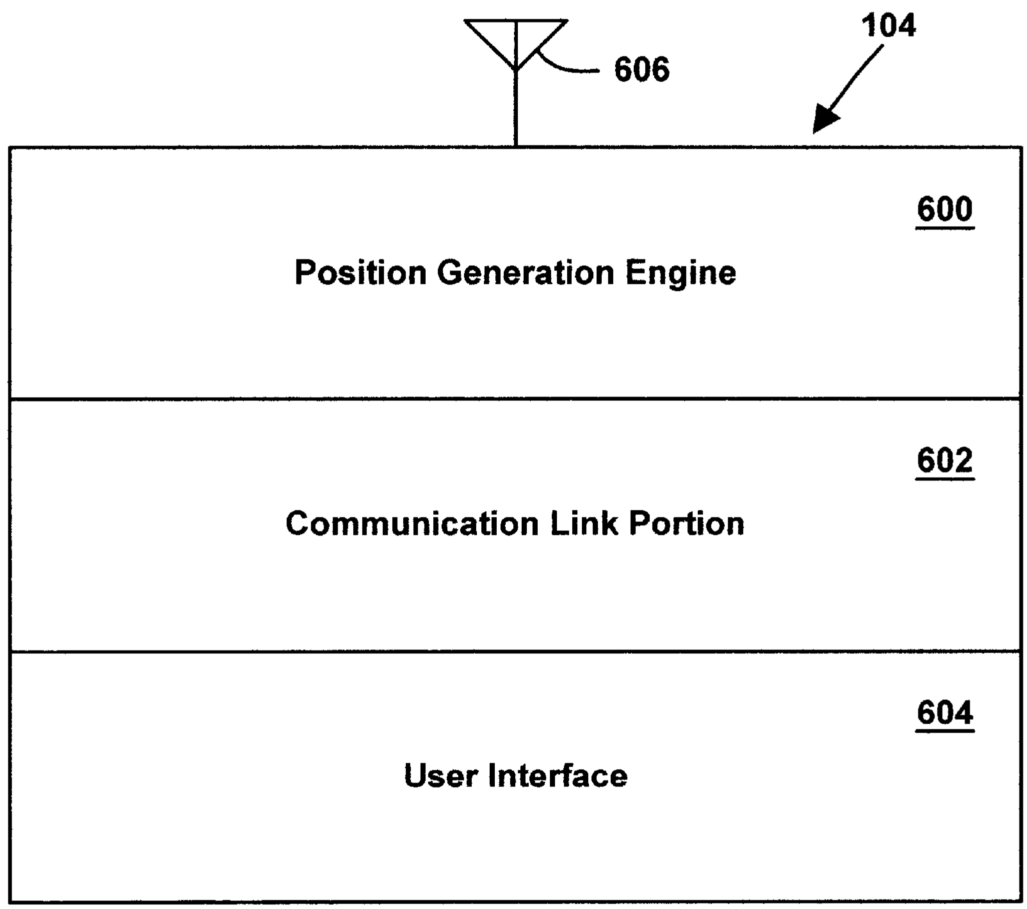
FIG. 6 is a schematic diagram of one embodiment of a rover unit in accordance with one embodiment of the present claimed invention.

Referring now to FIG. 6, a schematic diagram of a rover unit 104 is shown. In the embodiment of FIG. 6, rover unit 104 includes a position generation engine 600 for generating position information for rover unit 104. In the present embodiment, position generation engine 600 is adapted to generate position information using, for example, a satellite-based radio navigation system such as the Global Positioning System (GPS), or the Global Orbiting Navigational System (GLONASS). In one embodiment, position generation engine 600 is also able to generate velocity information when rover unit 104 is moving. Velocity information is obtained by measuring the Doppler shifts of signals between an antenna of rover unit 104 and navigation signal transmitters such as, for example, GPS satellites, not shown. The Doppler shift velocity measurements are obtained using well-known and well-understood techniques indigenous to the GPS receiver art. Thus, in one embodiment of the present invention, position information such as the speed, direction, and heading of rover unit 104 is obtained by position generation engine 600. Although such systems are specifically mentioned in the present embodiment, the present invention is also well suited to generating position information for rover unit 104 using various land-based radio navigation systems such as, for example, LORAN, and the like. As shown in FIG. 6, rover unit 104 also includes a communication link portion 602. In the present embodiment, communication link portion 602 also includes communication components such as, for example, a modem, a receiver, a transmitter, and the like. These communication components allow rover unit 104 to communicate effectively with, for example, server station 100 and reference stations 102*a*–102*d.* Furthermore, rover unit 104 includes a user interface 604. In the embodiment of FIG. 6, user interface 604 is comprised, for example, of: a keyboard; a graphic display; a mouse; and the like to enable a user to access and interact with rover unit 104. In the present embodiment, such interaction will include programming rover unit 104, selecting various operating functions for rover unit 104, and the like. Also, in the present embodiment, a transceiver antenna 606 is shown coupled to rover unit 104. It will be understood that transceiver antenna 606 is adapted to transmit and receive various signals.

IN OPERATION

Figure 7:
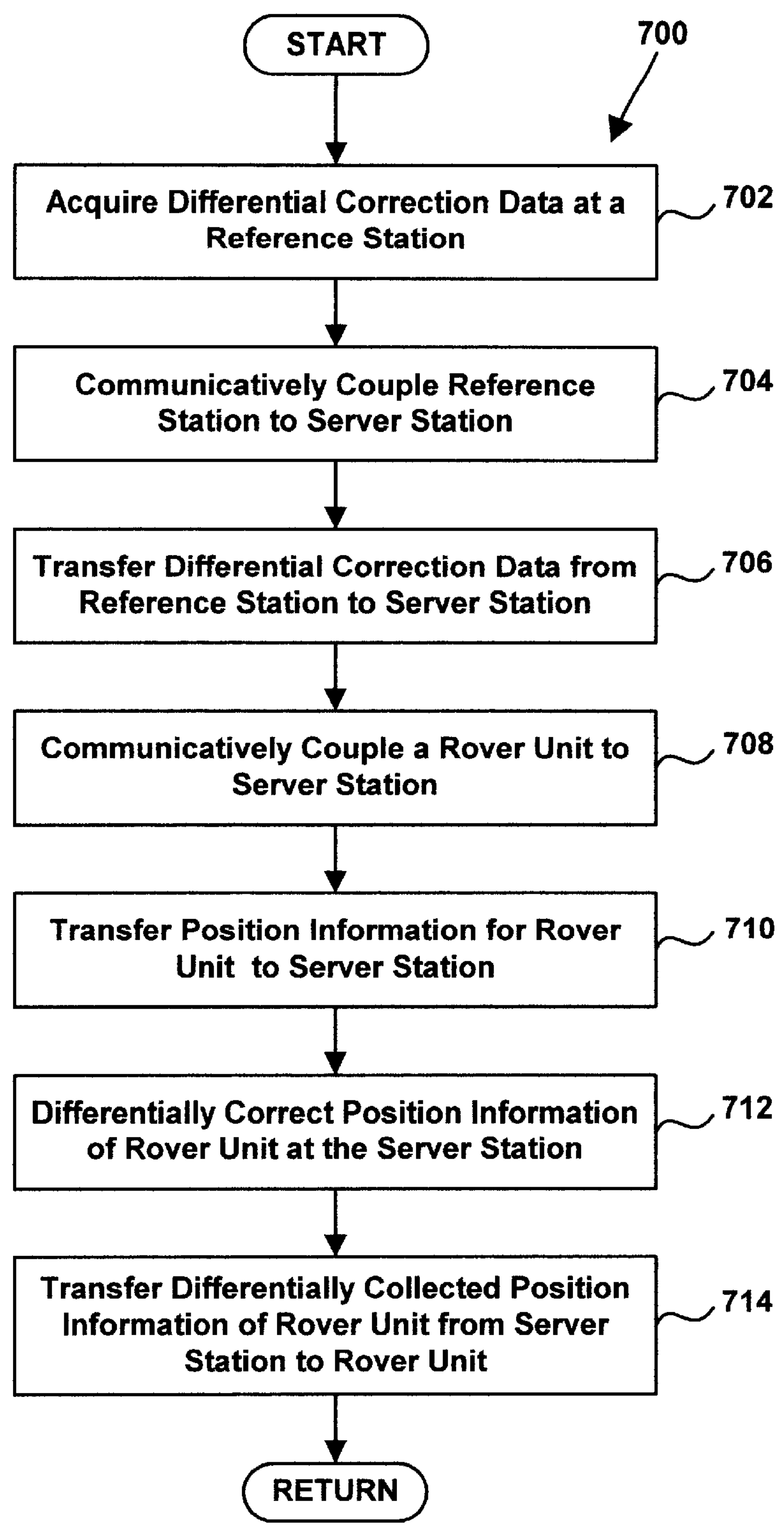
FIG. 7 is a flow chart of steps performed to provide differentially corrected position information to a rover unit in accordance with one embodiment of the present claimed invention.

The following is a detailed description of the operation of the present invention. With reference now to FIG. 7, a flow chart 700 of steps performed during operation of one embodiment of the present invention is shown. In the following discussion, the steps of FIG. 7 will be described in detail and will refer often to the physical components described above in conjunction with FIGS. 1–6. In the present embodiment, as recited in step 702, differential correction data is acquired at a reference station. In the present embodiment, each of the reference stations, 102_a_–102_d,_ will acquire GPS measurements and will generate differential correction data which is applicable to the area surrounding the respective reference station. That is, reference station 102_a_ will acquire GPS measurements and will generate differential correction data which is applicable to and accurate for the area near reference station 102_a;_ reference station 102_b_ will acquire GPS measurements and will generate differential correction data which is applicable to and accurate for the area near reference station 102_b;_ reference station 102_c_ will acquire GPS measurements and will generate differential correction data which is applicable to and accurate for the area near reference station 102_c;_ and reference station 102_d_ will acquire GPS measurements and will generate differential correction data which is applicable to and accurate for the area near reference station 102_d._ As mentioned above, although only four reference stations 102_a_–102_d_ are shown for purposes of clarity, the present invention is also well suited to having a lesser or greater number of reference stations acquire differential correction data. However, for purposes of clarity, the following discussion will refer to an example where the differential correction data received from reference station 102_d_ is most pertinent.

With reference still to step 702 of FIG. 7, in the present embodiment, the differential correction data generated and acquired at reference stations 102_a_–102_d_ comprises: reference station identification and coordinates; differential corrections; ephemeris data; and broadcast ionospheric model information. The present invention is also well suited to providing various other data which may be required by server station 100. Furthermore, in the present embodiment, the differential correction data is acquired at reference stations 102_a_–102_d_ using, for example, GPS system 518 and differential correction generator subsystem 520, both of FIG. 5.

Referring now to step 704, after the acquisition and computation of the differential correction data the present embodiment communicatively couples reference stations 102_a_–102_d_ to server station 100 using, for example, communications component 516 of FIG. 5 and data server portion 204 of FIGS. 2, 3, and 4. In the present embodiment, communication links between the various components of the present embodiment (e.g. reference stations 102_a_–102_d_ and server station 100) are established through any of various techniques. For example, communication links between, for example, server station 100 and reference stations 102_a_–102_d,_ or server station 100 and rover unit 104 can be established using a Metricomm Wide Area Network (WAN) link operating at approximately 900 MHz. Communication links between two components can be established using a standard cellular telephone connection. Communication links between the components can also be established using a trunked radio system. In such a system, for example, server station 100 first contacts headquarters or a communication base and is assigned a communication channel. Communication between server station 100 and one or more of reference stations 102_a_–102_d_ or rover unit 104 must take place over the assigned channel. Communication links between components can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, for example, by server station 100, and server station 100 is then assigned a channel. Server station 100 then bursts packet data, using, for example, TCP/IP protocol, to deliver the data to, for example, rover unit 104 until the data is completely transmitted or until the channel is no longer free. If the data is not completely transferred when the channel expires, communication links between the components are then established using a different channel. As yet another example, communication links between the components can be established using a Subscription Mobile Radio (SMR) system wherein an assigned frequency is used for communication. The present invention is also well suited to having rf-based communication links between any of the various components. The present invention is also well suited to establishing the aforementioned communication links using, for example, the Personal Handy Phone system (PHS).

In step 706, the present embodiment transfers the differential correction data from reference stations 102_a_–102_d_ to server station 100. In the present embodiment, reference data cache 202 (shown in FIGS. 2, 3 and 4) of server station 100 will store this data as well as some additional data types that will be arriving from reference stations 102_a_–102_d._ Server station 100 will maintain a copy of this data in reference data cache 202. In the present embodiment, there is no need to maintain a separate list of ephemeris data and ionospheric models for each reference station, only the union of these items from all reference stations 102_a_–102_d._ The ionospheric models arriving from different reference stations 102_a_–102_d_ are checked to determine if they are identical to the current most recent ionospheric model. If the new model coefficients are the same as the existing current model in reference data cache 202, the new broadcast model coefficients are ignored and are not stored in reference data cache 202 because they are already there. In this embodiment, differential correction data, however, are maintained on a reference station by reference station basis. That is, reference data cache 202 maintains differential correction data which is applicable to and accurate for the area near reference station 102_a;_ reference data cache 202 also maintains differential correction data which is applicable to and accurate for the area near reference station 102_b;_ reference data cache 202 further maintains differential correction data which is applicable to and accurate for the area near reference station 102_c;_ and reference data cache 202 maintains differential correction data which is applicable to and accurate for the area near reference station 102_d._

With reference still to step 706, in the present embodiment, data is stored in reference data cache 202 as is shown in Table 1 below.

TABLE 1

Content and Indexing of Reference Data Cache

| Item | Key field #1 | Key field #2 | Key field #3 |
|---|---|---|---|
| Reference data (PRC) | Reference Station ID | GPS Time (time) | — |
| Ephemeris | SV (1–32) | WN & TOE (time) | IODE |
| Almanac | SV (1–32) | WN & TOA (time) | — |
| Ionospheric model | GPS Time | — | |
| UTC information | GPS Time | WN & TOT | — |

TABLE 1-continued

Content and Indexing of Reference Data Cache

| Item | Key field #1 | Key field #2 | Key field #3 |
|---|---|---|---|
| | | (time) | |
| Current GPS time | N/A (current value) | — | — |
| Reference Positions | Reference Station ID | — | — |

As an example the differential correction data (Reference data in row 2) are recommended to be stored/indexed in the following order:

| Reference Station ID | GPS Week | GPS Seconds |
|---|---|---|
| 1 | 918 | 500410.00 (i.e. Friday, 19:00:10.00) |
| 1 | 918 | 500411.00 (i.e. Friday, 19:00:11.00) |

The ephemeris data are recommended to be assembled and stored in the following order:

| SV (PRN) | Reference Week (WN) GPS weeks | Reference Time (TOE) GPS seconds | IODE |
|---|---|---|---|
| 2 | 918 | 500400.00 | 123 |
| 2 | 918 | 504000.00 | 124 |

The almanac data are recommended to be assembled and stored in the following order:

| SV (PRN) | Reference Week (WN) GPS weeks | Reference Time (TOA) GPS seconds |
|---|---|---|
| 2 | 918 | 500400.00 |
| 2 | 919 | 504000.00 |

The ionospheric model data are recommended to be grouped by time:

| GPS time of collection | | | |
|---|---|---|---|
| GPS Weeks (WN) | GPS Seconds | Coefficients Alpha | Coefficients Beta |
| 917 | 504000.00 | 1.024E − 008 | 8.806E + 004 |
| | | 1.490E − 008 | 3.277E + 004 |
| | | −5.960E − 008 | −1.966E + 005 |
| | | 1.192E − 007 | −1.966E + 005 |
| 918 | 507600.00 | 1.026E − 008 | 8.807E + 004 |
| | | 1.494E − 008 | 3.278E + 004 |
| | | −5.966E − 008 | −1.968E + 005 |
| | | 1.200E − 007 | −1.968E + 005 |

If two broadcast ionospheric model sets are available with two different collection times (GPS Week and GPS Seconds), but otherwise identical elements, only the latest one will be stored in reference data cache 200. The one collected earlier will be discarded. The absolute sum of alpha coefficients and sum of beta coefficients are used to test the identity of two ionospheric models with different collection times within floating point round-off limits.

UTC data are recommended to be grouped in the following order:

| GPS time of collection | | Reference Time | |
|---|---|---|---|
| WN | GPS Seconds | WN | Reference Time (TOT) |
| 917 | 500400.00 | 911 | 503808.00 |
| 918 | 500400.00 | 912 | 503808.00 |

In the present embodiment, the difference between current week number of the GPS time of collection may differ from the reference week of UTC correction model to a maximum of 127 weeks. For this reason the UTC data are ordered by time of collection (GPS Week Number and GPS Seconds) rather than by the reference week and reference time (WN and TOT). However, the present embodiment always stores the UTC data with the most recent cumulative time. If two UTC data sets are available with two different collection times (GPS Week Number and GPS Seconds), but otherwise identical elements, only the latest one is stored in reference data cache 202, the one collected earlier is discarded. In the present embodiment, two UTC data sets are considered equal if all of their elements agree ($WN_t$, $WN_{LSF}$, TOT, $\Delta t_{LS}$, $\Delta t_{LSF}$, $a_0$, $a_1$) within floating point round-off limits.

The GPS system has an implementation where the maximum week number is 1023. The present embodiment makes sure that the GPS week numbers will not roll over to 0 after week 1023 (Aug. 21/22, 1999), and that they will be incremented to 1024, 1025, and so on. The GPS week number and time of week information is used to compute cumulative GPS time in this embodiment. Cumulative GPS time is defined as:

$$t_{GPSC}=WN*604800+TOW$$

where $t_{GPSC}$ is the cumulative GPS time

WN—is the GPS week number

TOW—is the GPS time of week in seconds (0 to 604800).

Cumulative GPS time is used to compare time tagged data in reference data cache 200.

Referring now to step 708, in the present embodiment, when a user of a rover unit (e.g. rover unit 104) desires to know the precise location of rover unit 104, the differentially corrected position information for rover unit 104 is required. As mentioned above, in many conventional systems, each prior art rover unit would include expensive sophisticated hardware and system components dedicated to determining the differentially corrected position of the rover unit. Again, as stated above, the requisite sophisticated hardware and system components needed to compute a differentially corrected position are a source of significant cost in such prior art rover units. In the present embodiment, however, when differentially corrected position information for rover unit 104 is requested, the determination of the differentially corrected position of rover unit 104 is calculated at server station 100 in a manner which will be described in the discussion pertaining to step 712. In the present embodiment, a user of rover unit 104 requests the differentially corrected position of rover unit 104 using, for example, user interface 604 of FIG. 6. In so doing, the expensive and sophisticated hardware and system components required to determine the differentially corrected position of the rover unit are disposed only at server station 100. Thus, the present embodiment eliminates the need for rover unit 104 to include an expensive and sophisticated differential correction engine. Additionally, the present invention also includes an embodiment in which additional data such as, for example, map information is forwarded to rover unit 104 along with the differentially corrected position information.

Referring still to step 708, after transferring the differential correction data from reference stations 102*a*–102*d* to server station 100 at step 706, the present embodiment communicatively couples rover unit 104 to server station 100. In the present embodiment, communication links between rover unit 104 and server station 100 are established as is described above in detail in conjunction with step 704. In the present embodiment, the communication link between rover unit 104 and server station 100 is initiated by rover unit 104 via communication link portion 602 of FIG. 6. As is described below in conjunction with FIG. 9, the present invention is also well suited to an embodiment in which the communication link between rover unit 104 and server station 100 is initiated by a component other than rover unit 104.

Figure 9:
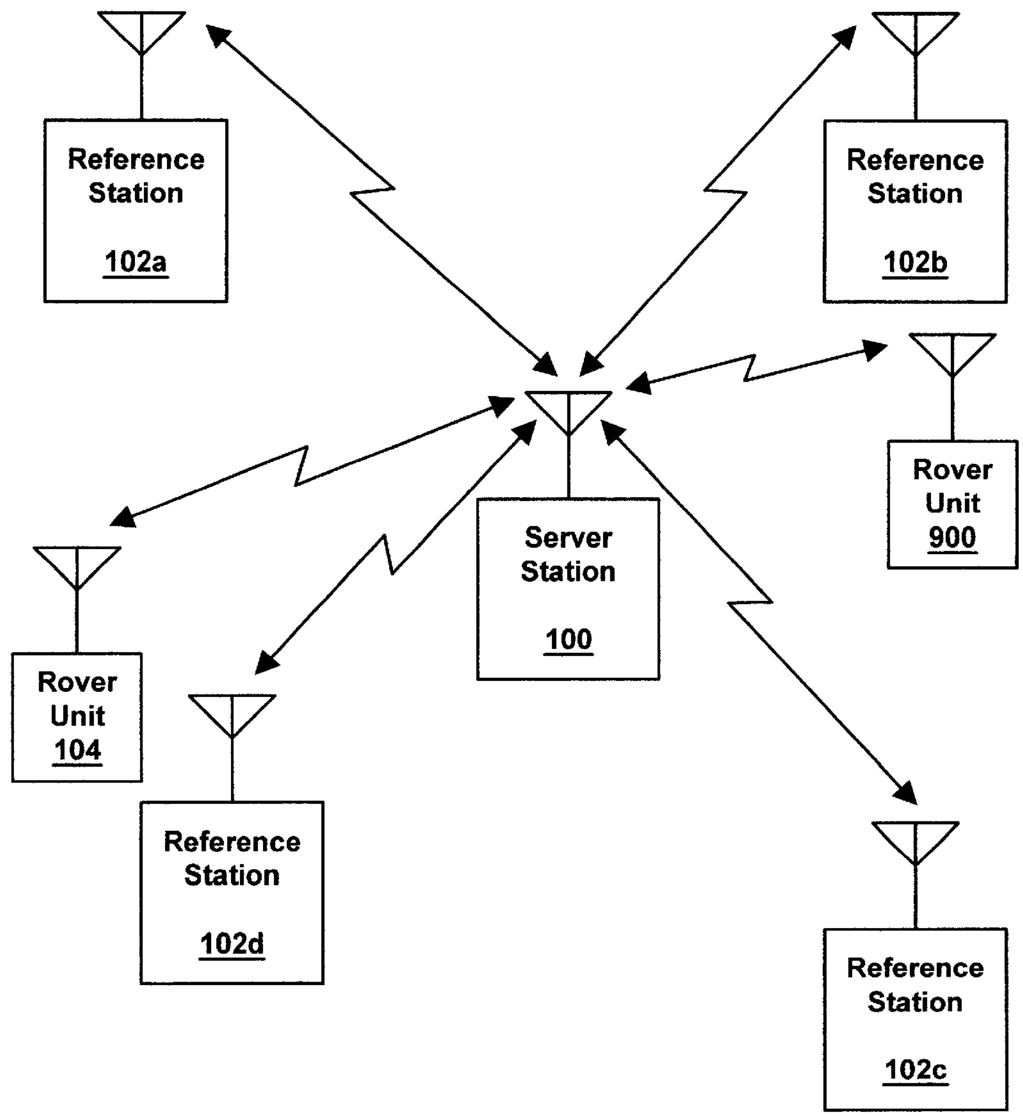
FIG. 9 is a schematic diagram of various components of a networked system in which a second rover unit requests information about a first rover unit in accordance with one embodiment of the present claimed invention.

With reference now to FIG. 9, the present invention is also well suited to an embodiment in which the differentially corrected position information of rover unit 104 is requested by a rover unit other than rover unit 104. For example, another rover unit 900, can request the differentially corrected position of rover unit 104. In such an embodiment, server station 100 initiates the establishment of a communication link between server station 100 and rover unit 104. In such an embodiment, server station 100 requests rover unit 104 to transmit its current position information to server station 100. As will be described below in conjunction with the description of steps 712 and 714, differential correction engine 200 of server station 100 then computes the differentially corrected position information for rover unit 104 and forwards the differentially corrected position information to requesting rover unit 900. Thus, a user of rover unit 900 is able to know the precise location of rover unit 104.

At step 710, the present embodiment transfers the position information of rover unit 104 to server station 100 via the communication link established at step 708. In the present embodiment, the uncorrected position information for rover unit 104 is calculated by position generation engine 600 of FIG. 6.

At step 712, once the uncorrected position information of rover unit 104 is received at server station 100, differential correction engine 200 of server station 100, both of FIGS. 2 and 4, differentially corrects the position information for rover unit 104. More specifically, differential correction engine 200 utilizes the differential correction data received from reference stations 102*a*–102*d* to compute the differentially corrected position of rover unit 104. In the present embodiment, server station 100 utilizes the most current differential corrections, ephemeris data, and ionospheric model. If there is a need to compute RTCM (Radio Technical Commission for Maritime Services) Type 2-like (Delta PRC and Delta RRC) corrections during step 712, the additional ephemeris data will be retrieved from reference data cache 202 by differential correction engine 200. In the present embodiment, the recommendation for differential corrections is that their time tag should not differ more than 30 seconds from the GPS time of the position information being processed. The reference time (TOE) of individual GPS satellite ephemeris data used for differential correction should not differ more than four hours (14400 seconds) from the time of the position information received from rover unit 104. Furthermore, in this embodiment, the requirement for broadcast ionospheric model time is that it should not differ more than a week (604800 seconds) from the time of the position information received from rover unit 104. In the present embodiment, the threshold values listed above will be chosen as default by differential correction engine 200. Data exceeding these thresholds will be ignored by differential correction engine 200. The present invention is, however, well suited to an embodiment utilizing various other threshold values.

With reference still to step 712, in the embodiment of FIG. 1, rover unit 104 is disposed proximate to reference station 102*d*. That is, reference station 102*d* is the nearest reference station to rover unit 104. By knowing both the position of all reference stations and the position information for rover unit 104, server station 100 is able to determine which reference station is nearest to rover unit 104. Furthermore, by determining which reference station is nearest to rover unit 104, server station 100 employs the most appropriate set of differential correction data to the position information of rover unit 104. As a result, in the embodiment of FIG. 1, server station 100 utilizes the differential correction data received from reference station 102*d* when differentially correcting the position information received from rover unit 104.

At step 714, the present embodiment transfers the differentially corrected position information of rover unit 104 back to rover unit 104 via a communication link as was described above in conjunction with step 708. In the present embodiment, steps 708 through 714 are performed in rapid succession such that rover unit 104 is able to obtain a differentially corrected position in near real time. For purposes of the present application, near real time refers to a time period of less than approximately five seconds. The present invention is also well suited to an embodiment in which rover unit 104 receives the differentially corrected position information at less than near real time speed. Thus, the present embodiment provides differentially corrected position information at a rover unit upon demand without requiring that the rover unit include its own differential correction engine.

With reference still to step 714, the present embodiment is able to provide differentially corrected position information to a rover unit even when the rover unit is disposed at a great distance from the server station. That is, unlike prior art systems, such as the aforementioned Krasner reference, the present embodiment is able to provide differentially corrected position information regardless of whether the server station and the rover unit have a common view of the GPS satellites of interest. The present embodiment merely requires that the rover unit is able to communicate with the server station. As a result, the present embodiment is not limited to the maximal range of approximately 150 kilometers associated with conventional systems.

Figure 8:
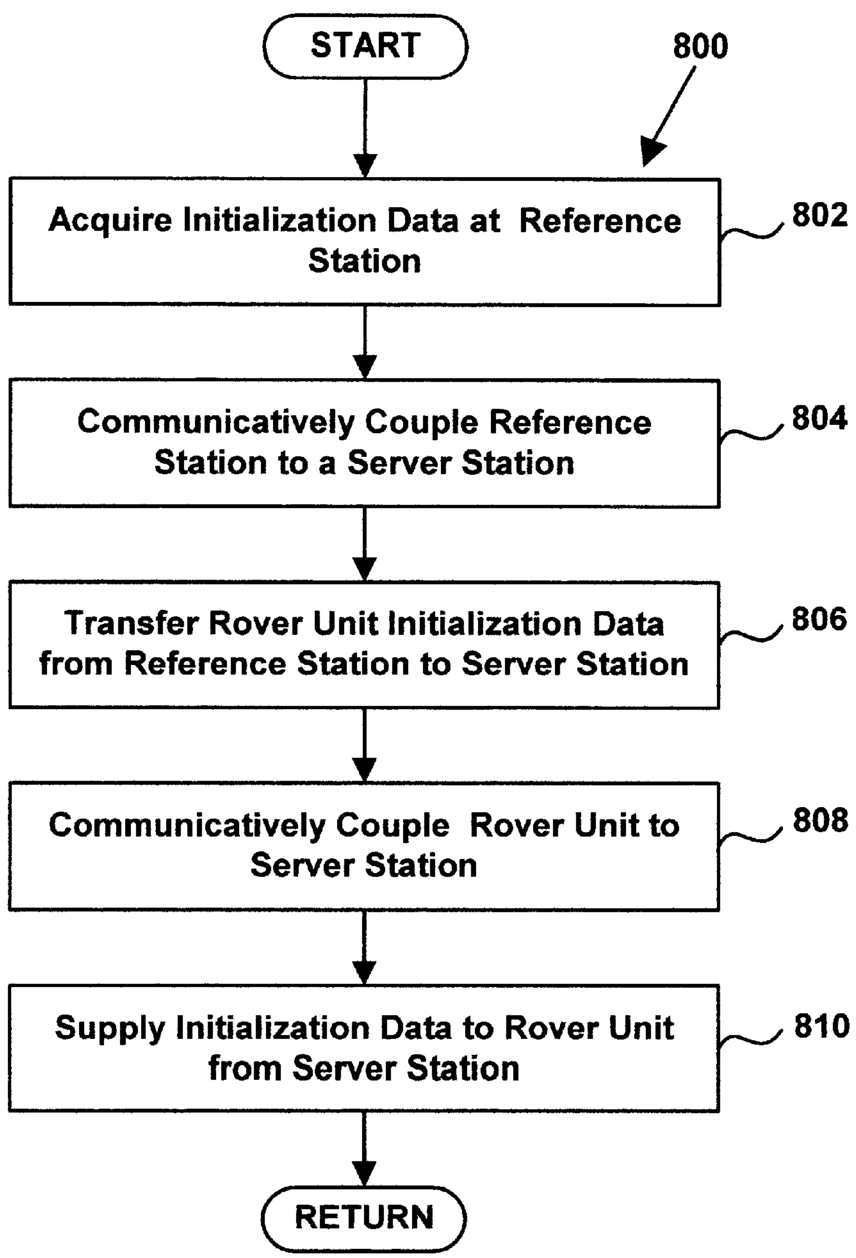
FIG. 8 is a flow chart of steps performed to provide initialization data to a rover unit in accordance with one embodiment of the present claimed invention.

With reference now to FIG. 8, a flow chart 800 of steps performed in accordance with another embodiment of the present invention is shown. In this embodiment, the present networked system, as shown in FIG. 1, provides rapid position information initialization for a rover unit.

In step 802, the present embodiment acquires rover unit initialization data at reference stations 102*a*–102*d*. In the present embodiment, each of the reference stations, 102*a*–102*d*, will acquire the rover unit initialization data.

With reference still to step 802 of FIG. 8, in the present embodiment, the rover unit initialization data acquired at reference stations 102*a*–102*d* comprises:

1. almanac
2. ephemeris data 3. approximate GPS time
4. satellite health information
5. broadcast ionospheric model, and
6. UTC information.
7. Approximate Position.

In the present embodiment, the rover unit initialization data is stored, for example, in reference data cache 202 of FIGS. 3 and 4. In this embodiment, reference data cache 202 of data server 100 will store and maintain the current GPS time as well as the incoming GPS satellite almanacs and ephemerides from all of reference stations 102*a*–102*d*. There is no need to maintain a separate list of almanac and ephemeris data for each reference station, only the union of these items should be stored from all reference stations, in the present embodiment.

Referring still to step 802, the almanacs and ephemeris data of the present embodiment must fulfill the requirements which are listed below. The almanac reference time (toa) used for warm start should not differ more than a week (604800 seconds) from the GPS time of request by rover unit 104 of FIG. 1 for rapid initialization. The ephemeris reference time (toe) used for warm start should not differ more than four hours (14400 seconds) from the GPS time of request by rover unit 104 of FIG. 1 for rapid initialization. In this embodiment, the approximate GPS time for rover unit initialization will also be provided by reference data cache 202 of FIGS. 3 and 4. Additionally, the GPS time of collection of ionospheric model and UTC information parameters should not differ more than a week (604800) from the GPS time of request by rover unit 104 of FIG. 1 for rapid initialization. The SV almanac, ionospheric model and UTC information do not change frequently, i.e., reference data cache 202 will have only a few changes of these elements during any given GPS week. The almanac satellite health information will be synthesized on demand from the individual satellite-specific almanac and ephemeris data. In another embodiment, the almanac satellite health information is obtained directly from the GPS receiver. In the present embodiment, a satellite will be declared healthy only if both the ephemeris and almanac are healthy. Furthermore, in the present embodiment, the approximate position provided by server station 100 to rover unit 104 for rover unit initialization should be accurate to 300 km or better compared to the actual position. This approximate position is assumed to be in the Latitude-Longitude-Altitude coordinate system on the World Geodetic System 1984 (WGS84) datum. The present invention is also well suited to providing various other data which may be required by server station 100. Furthermore, in the present embodiment, the rover unit initialization data is acquired at reference stations 102*a*–102*d* using, for example, GPS system 518 and differential correction generator subsystem 520, both of FIG. 5.

Referring now to step 804, after the acquisition of the rover unit initialization data the present embodiment communicatively couples reference stations 102*a*–102*d* to server station 100 using, for example, communications component 516 of FIG. 5 and data server portion 204 of FIGS. 3 and 4. In the present embodiment, communication links between the various components of the present embodiment (e.g. reference stations 102*a*–102*d* and server station 100) are established through any of various techniques. For example, communication links between, for example, server station 100 and reference stations 102*a*–102*d*, or server station 100 and rover unit 104 can be established using a Metricomm Wide Area Network (WAN) link operating at approximately 900 MHz. Communication links between two components can be established using a standard cellular telephone connection. Communication links between the components can also be established using a trunked radio system. In such a system, for example, server station 100 first contacts headquarters or a communication base and is assigned a communication channel. Communication between server station 100 and one or more of reference stations 102*a*–102*d* or rover unit 104 must take place over the assigned channel. Communication links between components can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, for example, by server station 100, and server station 100 is then assigned a channel. Server station 100 then bursts packet data, using, for example, TCP/IP protocol, to deliver the data to, for example, rover unit 104 until the data is completely transmitted or until the channel is no longer free. If the data is not completely transferred when the channel expires, communication links between the components are then established using a different channel. As yet another example, communication links between the components can be established using a Subscription Mobile Radio (SMR) system wherein an assigned frequency is used for communication. The present invention is also well suited to having rf-based communication links between any of the various components. The present invention is also well suited to establishing the aforementioned communication links using, for example, the Personal Handy Phone system (PHS).

At step 806, the present invention transfers the rover unit initialization data from reference stations 102*a*–102*d* via the communication link established at step 804.

Referring now to step 808, after transferring the rover unit initialization data from reference stations 102*a*–102*d* to server station 100 at step 806, the present embodiment communicatively couples rover unit 104 to server station 100. In the present embodiment, communication links between rover unit 104 and server station 100 are established as described above in detail in conjunction with step 804. In the present embodiment, the communication link between rover unit 104 and server station 100 is initiated by rover unit 104 via communication link portion 602 of FIG. 6.

With reference next to step 810, in the present embodiment, when a user of a rover unit (e.g. rover unit 104) wishes to initialize rover unit 104, rover unit initialization data is required. As mentioned above, in many conventional systems, each prior art rover unit would have to spend a considerable amount of time undergoing a time-consuming initialization process. During this time consuming process of the prior art, the rover unit would have to gather substantial initialization data from numerous GPS satellites. This prior art initialization process is often confusing to the average consumer. Additionally, the drawbacks associated with a conventional time-consuming initialization process are further compounded in a networked system, due to the constant addition of new subscribing rover units to the network. In the present embodiment, however, when initialization of rover unit 104 is requested, the rover unit initialization data is supplied to rover unit 104 from server station 100 using, for example, rover unit initialization data supplier 300 of FIGS. 3 and 4.

Referring still to step 810, in the present embodiment, a user of rover unit 104 requests the rover unit initialization data for rover unit 104 using, for example, user interface 604 of FIG. 6. In so doing, the present invention is able to rapidly supply initialization data to rover unit 104 from server station 100 on demand, thereby eliminating the need for rover unit 104 to gather the initialization data from numerous GPS satellites. As a result, the present embodiment reduces the time to a first position fix from several minutes, as is required in the prior art, to a few seconds. The benefits of the present embodiment are further compounded in a system having multiple rover units. That is, the time to a first position fix is reduced for each of the rover units. Furthermore, by eliminating the need for a time-consuming and sometimes confusing initialization process, the present embodiment renders the use of rover units more appealing to the average consumer.

In yet another embodiment, the present invention includes the features described in conjunction with both FIG. 7 and FIG. 8. That is, in such an embodiment, the networked system of FIG. 1 delivers both differentially corrected position information and rover unit initialization data, upon demand, to a rover unit. Server station 100, adapted for such an embodiment, is shown in FIG. 4. In the embodiment of FIG. 4, the server station includes both a differential correction engine 200 and a rover unit initialization data supplier 300.

Thus, the present invention provides a method and system for improving the operation of a rover unit in a networked system. Moreover, the present invention provides a method and system for improving the operation of a rover unit in a networked system without significantly increasing the system and hardware requirements of the rover unit.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A networked system for providing differentially corrected position information to a rover unit, said networked system comprising:

a server station, said server station having a differential correction engine for differentially correcting position information when requested;

a reference station communicatively coupleable to said server station, said reference station providing differential correction data to said server station such that said server station is able to utilize said differential correction data when differentially correcting position information;

a rover unit communicatively coupleable to said server station, said rover unit having a position generation engine for providing position information of said rover unit, said rover unit further adapted to request said server station to differentially correct said position information of said rover unit and return differentially corrected position information of said rover unit to said rover unit such that said rover unit acquires said differentially corrected position information upon demand without requiring said rover unit to have a differential correction engine integral therewith.

2. The networked system of claim 1 wherein said rover unit is able to acquire said differentially corrected position information upon demand in near-real time.

3. The networked system of claim 1 wherein said rover unit is also able to acquire map information from said server station.

4. The networked system of claim 1 wherein said networked system further provides rapid position information initialization, said networked system further comprising:

said reference station is further adapted to provide rover unit initialization data to said server station;

said server station having memory for storing said rover unit initialization data, said server station adapted for supplying said rover unit initialization data to said rover unit when requested; and said rover unit further adapted to request said server station to provide said rover unit initialization data to said rover unit such that said rover unit is initialized and obtains a first position fix without requiring said rover unit to acquire said initialization data directly from at least one satellite.

5. The networked system of claim 4 wherein said initialization data is selected from the group consisting of: ephemeris data, almanac data, satellite health data, ionospheric data, UTC and GPS time information, and approximate rover position information.

6. The networked system of claim 5 wherein said time information is structured such that GPS week numbers do not roll over to zero after week 1023.

7. A networked system for rapidly initializing a rover unit, said networked system comprising:

a server station having memory for storing rover unit initialization data, said server station adapted for supplying said rover unit initialization data when requested;

a reference station communicatively coupleable to said server station, said reference station providing said rover unit initialization data to said server station; and a rover unit communicatively coupleable to said server station, said rover unit further adapted to request said server station to provide said rover unit initialization data to said rover unit such that said rover unit is initialized and obtains a first position fix without requiring said rover unit to acquire said initialization data directly from at least one satellite.

8. The networked system for rapidly initializing a rover unit of claim 7 wherein said initialization data is selected from the group consisting of: ephemeris data, almanac data, satellite health data, ionospheric data, utc and GPS time information, and approximate rover position information.

9. The networked system for rapidly initializing a rover unit of claim 8 wherein said time information is structured such that GPS week numbers do not roll over to zero after week 1023.

10. The networked system for rapidly initializing a rover unit of claim 7 wherein said networked system further provides differentially corrected position information, said networked system further comprising:

said server station having a differential correction engine for differentially correcting position information when requested;

said reference station providing differential correction data to said server station such that said server station is able to utilize said differential correction data when differentially correcting position information;

said rover unit having a position generation engine for providing position information of said rover unit, said rover unit further adapted to request said server station to differentially correct said position information of said rover unit and return differentially corrected position information of said rover unit to said rover unit such that said rover unit acquires said differentially corrected position information upon demand without requiring said rover unit to have a differential correction engine integral therewith.

11. The networked system of claim 10 wherein said rover unit is able to acquire said differentially corrected position information upon demand in near-real time.

12. The networked system of claim 10 wherein said rover unit is also able to acquire map information from said server station.

13. A method for rapidly initializing a rover unit, said method comprising the steps of:

a) acquiring rover unit initialization data at a reference station;

b) communicatively coupling said reference station to a server station having memory for storing said rover unit initialization data;

c) transferring said rover unit initialization data from said reference station to said server station;

d) communicatively coupling said rover unit to said server station; and e) supplying said rover unit initialization data from said server station to said rover unit such that said rover unit is initialized and obtains a first position fix without requiring said rover unit to acquire said initialization data directly from at least one satellite.

14. The method as recited in claim 13 wherein step e) further comprises the step of:

supplying said rover unit initialization data from said server station to said rover unit upon request by said rover unit such that said rover unit is initialized upon demand and obtains said first position fix without requiring said rover unit to acquire said initialization data directly from said at least one satellite.

15. The method as recited in claim 13 wherein step e) further comprises the step of:

supplying initialization data selected from the group consisting of: ephemeris data, almanac data, satellite health data, ionospheric data, UTC and GPS time information, and approximate rover position information.

16. The method as recited in claim 15 wherein step e) further comprises the step of:

supplying said time information from said server station to said rover unit wherein said time information is structured such that GPS week numbers do not roll over to zero after week 1023.

17. The method as recited in claim 13 further comprising the steps of:

f) acquiring differential correction data at said reference station;

g) communicatively coupling said reference station to said server station having a differential correction engine for differentially correcting received position information when requested;

h) transferring said differential correction data from said reference station to said server station such that said server station is able to utilize said differential correction data when differentially correcting said received position information;

i) communicatively coupling said rover unit having a position generation engine for providing position information of said rover unit to said server station;

j) upon request by said rover unit, transferring said position information of said rover unit to said server station;

k) differentially correcting said position information of said rover unit at said server station such that differentially corrected position information of said rover unit is calculated by said server station; and l) transferring said differentially corrected position information of said rover unit from said server station to said rover unit such that said rover unit acquires said differentially corrected position information upon demand without requiring said rover unit to have a differential correction engine integral therewith.

18. The method as recited in claim 17 wherein step l) comprises transferring said differentially corrected position information to said rover nit in near-real time such that said rover unit receives said differentially corrected position information of said rover unit upon demand and in near-real time.

19. The method as recited in claim 17 wherein step l) comprises transferring map information to said rover unit.

20. A method for providing differentially corrected position information to a rover unit in a networked system, said method comprising the steps of:

a) acquiring differential correction data at a reference station;

b) communicatively coupling said reference station to a server station having a differential correction engine for differentially correcting received position information when requested;

c) transferring said differential correction data from said reference station to said server station such that said server station is able to utilize said differential correction data when differentially correcting said received position information;

d) communicatively coupling a rover unit having a position generation engine for providing position information of said rover unit to said server station;

e) upon request by said rover unit, transferring said position information of said rover unit to said server station;

f) differentially correcting said position information of said rover unit at said server station such that differentially corrected position information of said rover unit is calculated by said server station; and g) transferring said differentially corrected position information of said rover unit from said server station to said rover unit such that said rover unit acquires said differentially corrected position information upon demand without requiring said rover unit to have a differential correction engine integral therewith.

21. The method for providing differentially corrected position information to a rover unit in a networked system as recited in claim 20 wherein step g) comprises transferring said differentially corrected position information to said rover unit in near-real time such that said rover unit receives said differentially corrected position information of said rover unit upon demand and in near-real time.

22. The method for providing differentially corrected position information to a rover unit in a networked system as recited in claim 20 wherein step g) comprises transferring map information to said rover unit.

23. The method for providing differentially corrected position information to a rover unit in a networked system as recited in claim 20 said method comprising the steps of:

h) acquiring rover unit initialization data at said reference station;

i) communicatively coupling said reference station to said server station having memory for storing said rover unit initialization data;

j) transferring said rover unit initialization data from said reference station to said server station;

k) communicatively coupling said rover unit to said server station; and l) supplying said rover unit initialization data from said server station to said rover unit such that said rover unit is initialized and obtains a first position fix without requiring said rover unit to acquire said initialization data directly from at least one satellite.

24. The method as recited in claim 23 wherein step l) further comprises the step of:

supplying said rover unit initialization data from said server station to said rover unit upon request by said rover unit such that said rover unit is initialized upon demand and obtains said first position fix without requiring said rover unit to acquire said initialization data directly from said at least one satellite.

25. The method as recited in claim 23 wherein step l) further comprises the step of:

supplying initialization data selected from the group consisting of: ephemeris data, almanac data, satellite health data, ionospheric data, UTC and GPS time information, and approximate rover position information.

26. A rover unit adapted for use in a networked system, said rover unit comprising:

a position generation engine for providing position information of said rover unit;

a communication link portion coupled to said position generation engine, said communication link portion adapted to communicatively couple said rover unit to a server station, said rover unit further adapted to request said server station to differentially correct said position information of said rover unit and return differentially corrected position information of said rover unit to said rover unit such that said rover unit acquires said differentially corrected position information upon demand without requiring said rover unit to have a differential correction engine integral therewith.

27. The rover unit of claim 26 wherein said rover unit is able to acquire said differentially corrected position information upon demand in near-real time.

28. The rover unit of claim 26 wherein said rover unit is able to acquire map information from said server station.

29. The rover unit of claim 26 wherein said rover unit is further adapted to receive rover unit initialization data from said server station such that said rover unit is initialized and obtains a first position fix without requiring said rover unit to acquire said initialization data directly from at least one satellite.

30. The rover unit of claim 26 wherein said rover unit is adapted to receive said rover unit initialization data selected from the group consisting of: ephemeris data, almanac data, satellite health data, ionospheric data, utc and GPS time information, and approximate rover position information.

* * * * *